(12) United States Patent
Pasqualini (10) Patent No.: US 7,690,137 B2
(45) Date of Patent: Apr. 6, 2010

(54) METHOD AND DEVICE FOR CONNECTING A WEAR PART TO THE SUPPORT THEREOF ON MATERIAL HANDLING DEVICES ON HEAVY CONSTRUCTION MACHINERY

(75) Inventor: Charles Pasqualini, Feurs (FR)

(73) Assignees: PREDAC, Feurs (FR); AFE Metal, Feurs (FR)

( * ) Notice: Subject to any disclaimer, the term of this patent is extended or adjusted under 35 U.S.C. 154(b) by 0 days.

(21) Appl. No.: 11/912,615

(22) PCT Filed: Apr. 19, 2006

(86) PCT No.: PCT/FR2006/050355

§ 371 (c)(1), (2), (4) Date: Nov. 15, 2007

(87) PCT Pub. No.: WO2006/114538

PCT Pub. Date: Nov. 2, 2006

(65) Prior Publication Data

US 2008/0184603 A1      Aug. 7, 2008

(30) Foreign Application Priority Data

Apr. 26, 2005    (FR)    ................................... 05 51080

(51) Int. Cl.
*E02F 9/28*      (2006.01)
(52) U.S. Cl. .............................. 37/455; 37/456; 37/457; 403/318; 403/319
(58) Field of Classification Search .................. 37/459, 37/455–458; 403/318, 319, 294, 355
See application file for complete search history.

(56) References Cited

U.S. PATENT DOCUMENTS

| | | | | | |
|---|---|---|---|---|---|
| 4,056,893 | A | * | 11/1977 | Willard | 37/455 |
| 4,324,057 | A | * | 4/1982 | White | 37/457 |
| 4,716,668 | A | * | 1/1988 | Hahn | 37/458 |
| 5,205,057 | A | * | 4/1993 | Garman | 37/458 |
| 5,435,084 | A | * | 7/1995 | Immel | 37/398 |
| 5,765,301 | A | * | 6/1998 | Clendenning | 37/457 |
| 6,079,132 | A | * | 6/2000 | Clendenning | 37/457 |
| 7,162,818 | B2 | * | 1/2007 | Ruvang et al. | 37/456 |
| 2002/0074851 | A1 | * | 6/2002 | Montgomery | 299/107 |

OTHER PUBLICATIONS

International search report for PCT/FR2006/050355, dated Apr. 19, 2006.

* cited by examiner

*Primary Examiner*—Thomas A Beach
*Assistant Examiner*—Matthew R Buck
(74) *Attorney, Agent, or Firm*—Heslin Rothenberg Farley & Mesiti P.C.

(57) ABSTRACT

A device for connecting a wear part to a support thereof on materials handling equipment for public works machines, comprises a key placed in an axial alignment with regard to an elastically deformable sleeve placed in part of an adapter. The key has a key foot and a key head on either side and opposite ends of a body. The key head is arranged with a part forming an off-centered seat. The key foot comprises an anchoring element for temporarily penetrating into the elastically deformable sleeve. Rotation of the key causes its misalignment with regard to its initial axis and the tight securing of the key, either in the sleeve by anchoring, or against metal parts of the tooth and of the adapter on differentiated support zones.

16 Claims, 10 Drawing Sheets

METHOD AND DEVICE FOR CONNECTING A WEAR PART TO THE SUPPORT THEREOF ON MATERIAL HANDLING DEVICES ON HEAVY CONSTRUCTION MACHINERY

CROSS REFERENCE TO RELATED APPLICATIONS

This application is a national stage filing under section 371 of International Application No. PCT/FR06/050355, filed on Apr. 19, 2006, and published in French on Nov. 2, 2006, as WO 2006/114538A1, and claims priority of French application No. 0551080 filed on Apr. 26, 2005, the entire disclosure of these applications being hereby incorporated herein by reference.

BACKGROUND ART

The invention relates to the technical field of load handling equipment, in particular public works machines having skips, buckets or other means for scraping, extracting, shifting materials and others for their removal from a given place to other operating stations using the said machines.

The prior art teaches how to place wear parts on the cutting blade of various buckets, skips and other receptacles, for their penetration capacity and their protection. "Adapter-supports" are fixed to the cutting blades, having a profiled nose, while the wear parts are teeth or shields which are positioned on the adapter-support by a precise, temporary linkage to allow their replacement after wear. Various technologies are available, like those developed by the applicants themselves.

The linkage is provided in most cases by keying, the tooth or the shield and the adapter support being profiled to accommodate the key. This may be metallic with an exclusively mechanical assembly, or with the incorporation of a support element of elastic material, which may also be in the form of a sleeve preformed or prepared in situ by pouring resin.

Also known is the design of keys called "sandwich" designed with two components receiving an elastic lining. In most cases, the assembly and disassembly of the keys take place by the action of striking tools.

Thus, with regard to the prior art, mention can be made of the patents EP 0618.334, WO 2004/035945, and EP 1.048.792. To be efficient, the keying devices must guarantee a firm link of the elements that they combine, which makes their assemblies and disassemblies often difficult with the risk of injury to the operators.

In the case of keyings, not requiring the use of striking tools, special and difficult equipment is necessary, above all for dismantling. According to the known devices, these keyings are complicated, excessively mechanical, and intolerant of the presence of materials detrimental to their operation.

The approach of the applicants was therefore to reflect on a novel design of the key linkage device allowing the abandonment of striking operations, both for assembling and disassembling the teeth, thereby guaranteeing the safety of the operators, while ensuring the performance of the tooth-adapter link by a simple, readily accessible system.

A further object of the invention was to provide a device not demanding geometrical rigour in the relative positioning of the tooth with regard to the adapter.

These objects and others will clearly appear from the rest of the description.

BRIEF SUMMARY OF INVENTION

According to a first feature, the device for connecting a wear part and its support activated on materials handling equipment for public works machines, of the type including the fitting of a tooth on an adapter, and their linkage with a sleeve made from elastically deformable material and a key, the tooth and the adapter being profiled with openings and zones for accommodating the said sleeve and the key where it is immobilised, is characterised in that the key is placed in an axial alignment with regard to the sleeve, the said sleeve being placed in part of the adapter, is characterised in that the said key has an end part called key foot and a key head on either side of a body, and in that the body is introduced into the said sleeve while the key head projects beyond it, and in that the key head is arranged with a part forming an off-centred seat capable of performing a support and thrust function against a matching shape installed in a first orifice of the tooth, and in that the end of the key head can be rotated by operating means, and in that the key foot comprises anchoring means which can penetrate temporarily into the elastically deformable sleeve by a first tightening action of a predefined value, and in that the end of the key foot is arranged with a conical portion to bear against a second orifice of the tooth as part of a tightening action greater than the previous one and resulting from the rotation of the key, and in that the rotation of the key causes its misalignment with regard to its initial axis and the tight securing of the said key, either in the sleeve by anchoring, or against the metal parts of the tooth and of the adapter on differentiated support zones.

The solution implemented by the invention to meet the initial objectives reveals unexpected advantages and more particularly, the possibility offered to the operator of being able to adjust the position of the key in situ as required, according to the anchoring, thrust and counterthrust forces preset at desired values. This solution is particularly advantageous because it optimises the fixing and connection in accordance with the environmental stresses throughout the life of each tooth.

These and other features will clearly appear from the rest of the description.

BRIEF DESCRIPTION OF THE DRAWING FIGS.

To clarify the subject matter of the invention illustrated in a non-limiting manner in the figures of the drawings in which.

To describe the invention in more concrete terms, it is now described in a non-limiting manner in the figures of the drawings.

DETAILED DESCRIPTION

The connecting device between the tooth (D) and the adapter support (A) of the invention implements a particular configuration of the key referenced as a whole by (C) in an elastically deformable sleeve (F) and also configured specifically and in combination with particular arrangements of the tooth and the adapter, in order to perform a clearly defined function. This function consists in allowing the orientation of the key as desired in the sleeve in the axial direction and in rotation. The sleeve is thereby partially compressed and restores an adjustable reactive force which determines that of the retention of the tooth and which is in a service situation, securing the key (C) from the risk of accidental exit while maintaining it in the selected angular position. In other words, the key, which is introduced axially into the sleeve along a pre-defined axial line is then oriented angularly to be anchored partially in the sleeve, and to have a tight contact with one or both orifices of the tooth and with that of the adapter, and as a function of the tightening forces produced and the rotation amplitude of the key misalignment at the appropriate connecting locations. This keying can be implemented in a vertical or horizontal position, the latter position being illustrated in the figures of the drawings.

To perform the above mentioned functions, the components are now described.

Figure 1:
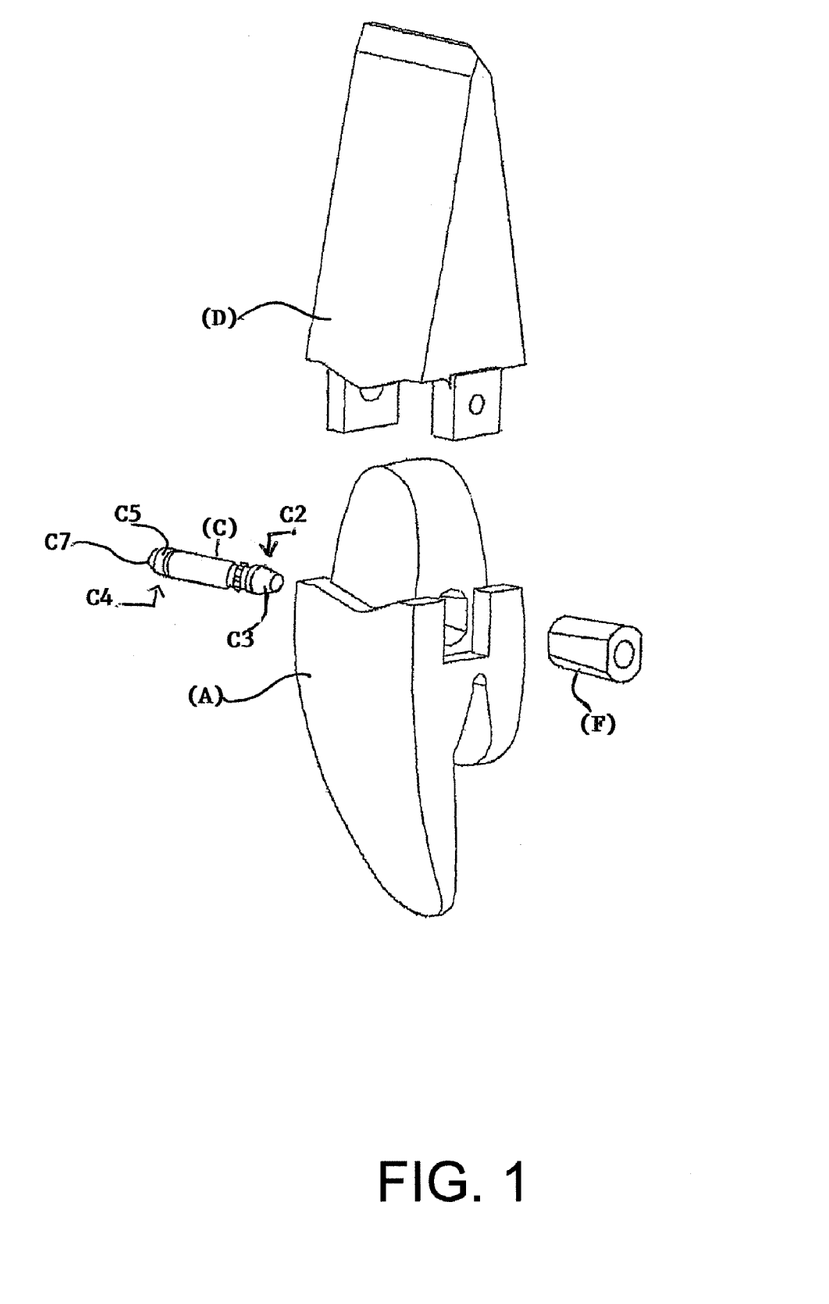
FIG. 1 is an exploded perspective view of the device of the invention before assembly between tooth and adapter.
Figure 2:
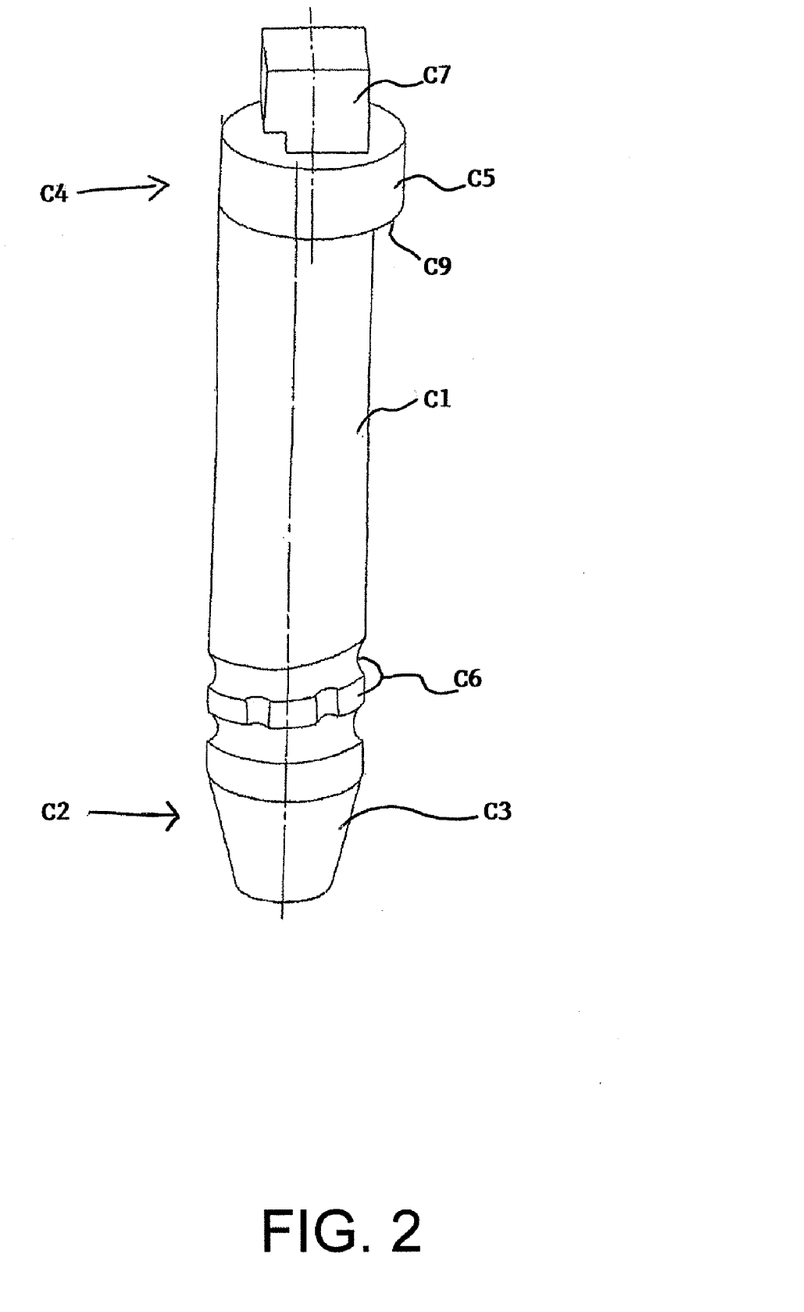
FIG. 2 is a perspective view of the key of the invention.
Figures 3, 5:
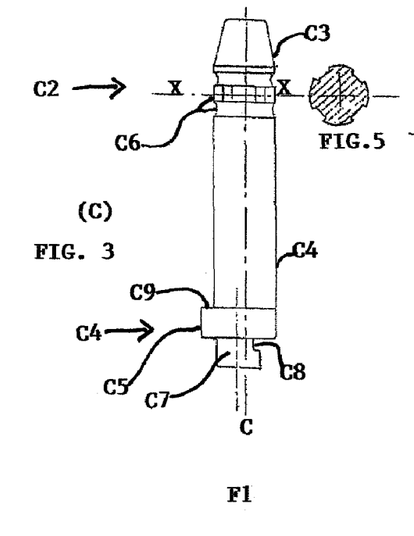
FIG. 3 is a plan view of the key.
FIG. 5 is a cross section along XX of FIG. 3.
Figure 4:
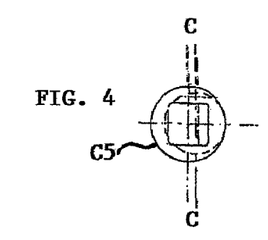
FIG. 4 is a front view of the key along the arrow F1 in FIG. 3.

The rigid, monolithic, cylindrical key (C1) comprises an elongated body (1) with a lower end zone called key foot (C2) including a final frustoconical part (C3) and a zone (C6) configured with an arrangement of hollow and relief shapes to provide a capacity for anchoring the key in the sleeve. In the non-limiting embodiment shown in FIG. 3, this zone (C6) has one or more splines or grooves whereof the depth decreases with increasing distance from the end of the key foot. These coaxial grooves are supplemented on the periphery by hollow linkage zones (C6.1) in order to constitute catching parts, as described below. The key (C) has at its other end (C4) constituting the key head, a cylindrical portion (C5), offset and having a larger diameter than that of the body (C1). This offset is such as shown in FIGS. 3, 4 that it is partly tangentially abutting of the body (C1) and projecting at the opposite end of this part to form an off-centering. Beyond this offset (C5) and at the end, the key has a relief zone (C7) with one or more notches (C8) enabling the gripping of a disassembling tool. The key has a face (C9) for connection between the body (C1) and the offset (C5).

This key (C) is designed according to the invention, to be able to make a complete 360° rotation about itself in one direction or in the other. This key therefore has inherent specificities connected with the implementation of the invention.

Without going beyond the framework of the invention, the key head can be arranged with any shape during the accommodation of an operating tool in order to control the rotation of the key in the operating conditions developed below.

Figure 6:
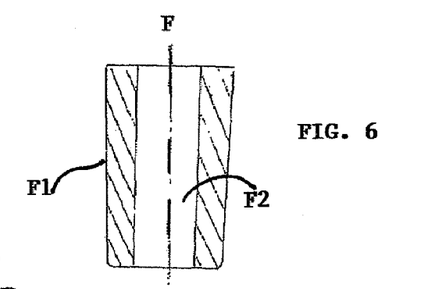
FIG. 6 is a longitudinal cross section of the sleeve.
Figure 6A:
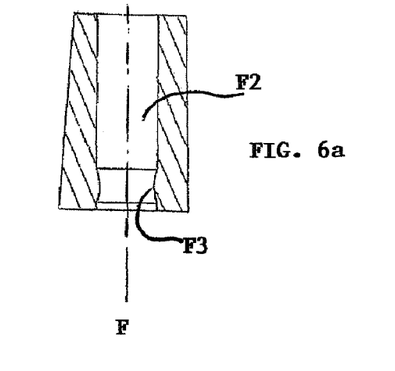
FIG. 6a is a longitudinal cross section of an alternative sleeve.
Figure 7:
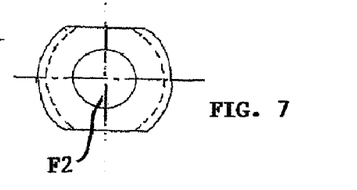
FIG. 7 is a plan view of the sleeve of FIG. 6.

It is accordingly important to describe the features of the sleeve (F) with reference to FIGS. 6, 6.1, and 7.

The sleeve (F) receiving the key (2) is made from a material having an elastic deformation capacity. This sleeve with frustoconical outer shape (F1) has a large length but shorter than that of the nose section of the adapter in which it is accommodated. Internally, it has a central hole (F2) the diameter of which is equal to that of the body (C1) of the key. Its thickness varies according to the misalignment position that may be assumed by the key (C) in a service situation. This thickness is a maximum in the receiving zone of the key foot (C2) whereof the angular movement is greater during the misalignment. Only the body (C1) of the key enters into the sleeve, the head (C4) with in particular the offset part (C5) and the relief zone (C7) remaining outside the sleeve. To guarantee pronounced anchoring of the key in the sleeve, as shown in FIG. 6.1, a slight internal shrinkage at (F3) can be considered, contributing to the anchoring force. Thus, and contrary to the known and usual shapes of sleeves of the prior art, the sleeve implemented according to the invention has a simplified configuration.

The tooth (D) and adapter (A) suitable for accommodating the above mentioned key and sleeve are now described.

Figure 8:
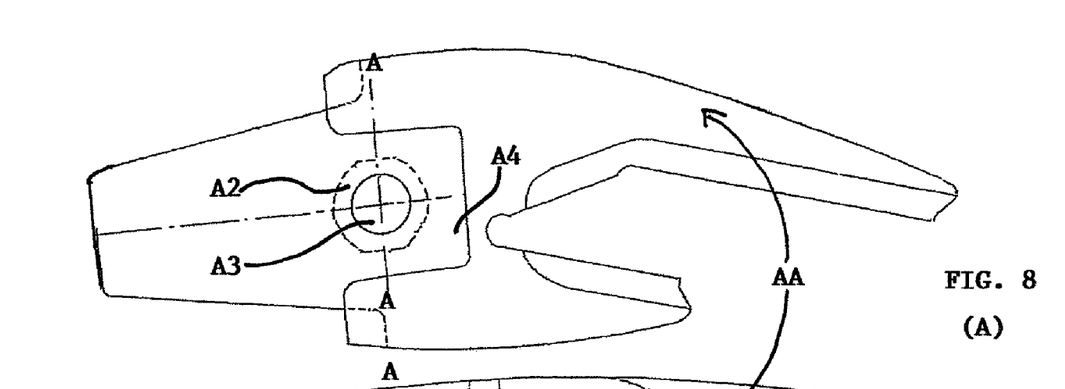
FIG. 8 is a side view of the adapter.
Figure 9:
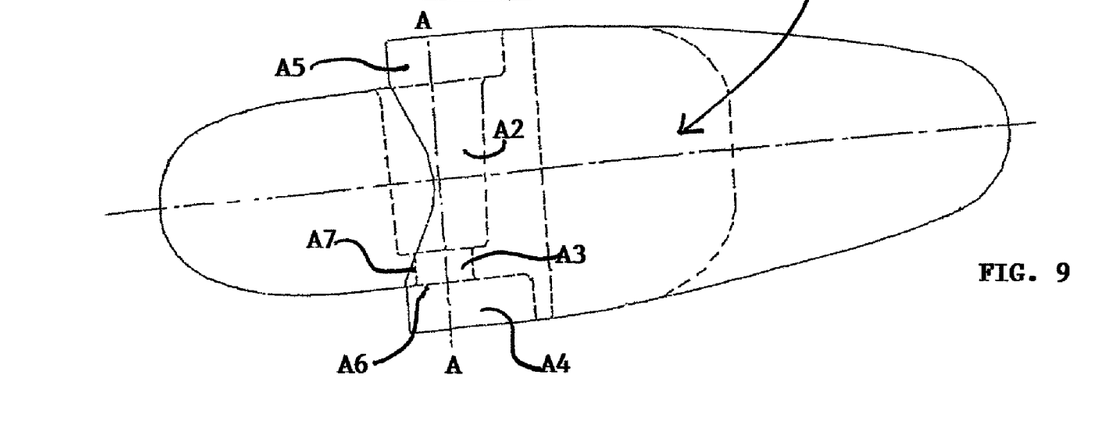
FIG. 9 is a plan view of the adapter.

The adapter (A), shown in FIGS. 8 and 9, has a first orifice forming a transverse housing (A2) with a frustoconical configuration for the guided reception of the sleeve having a matching configuration. The transverse housing (A2) is suitable for accommodating the sleeve being therefore established on only part of the width of the receiving zone of the adapter. This transverse housing therefore has a sleeve stop face. It is prolonged by a matching second orifice or hole (A3) projecting into the outer side recess (A4) of the adapter. The diameter of the hole (A3) is deliberately larger than that of the body of the key (C1) to avoid any premature contact with the key during its first misalignment phases. The sleeve is introduced via the opposite side recess (A5). The space between the hole (A3) and the end of the housing (A2) of the sleeve (F) forms the shoulder (A7).

Figures 10, 11:
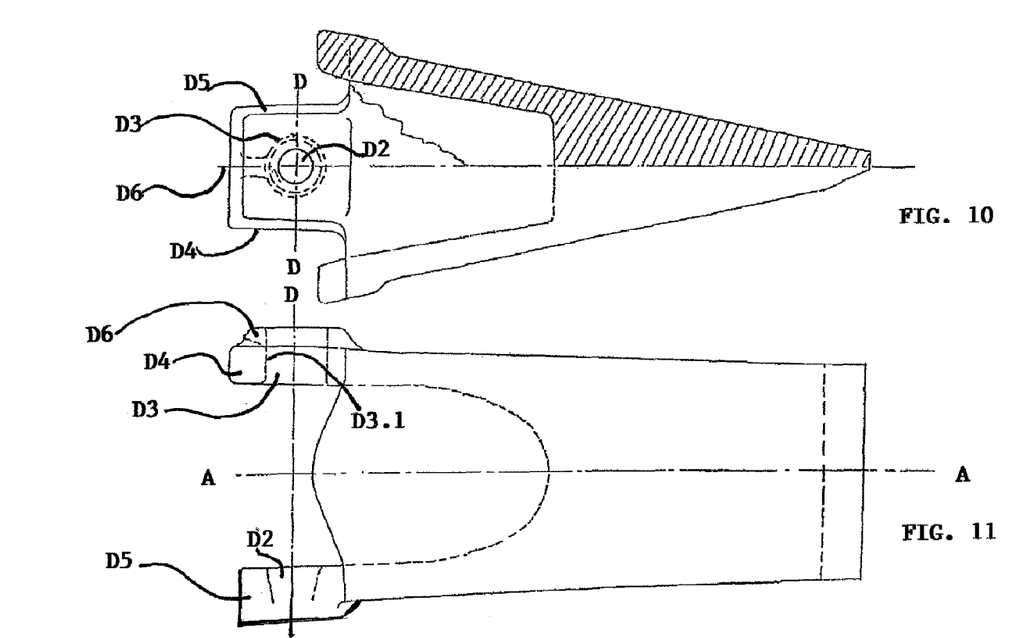
FIG. 10 is a view of the tooth with a half-portion in a longitudinal cross section.
FIG. 11 is a plan view of the tooth.
Figure 12:
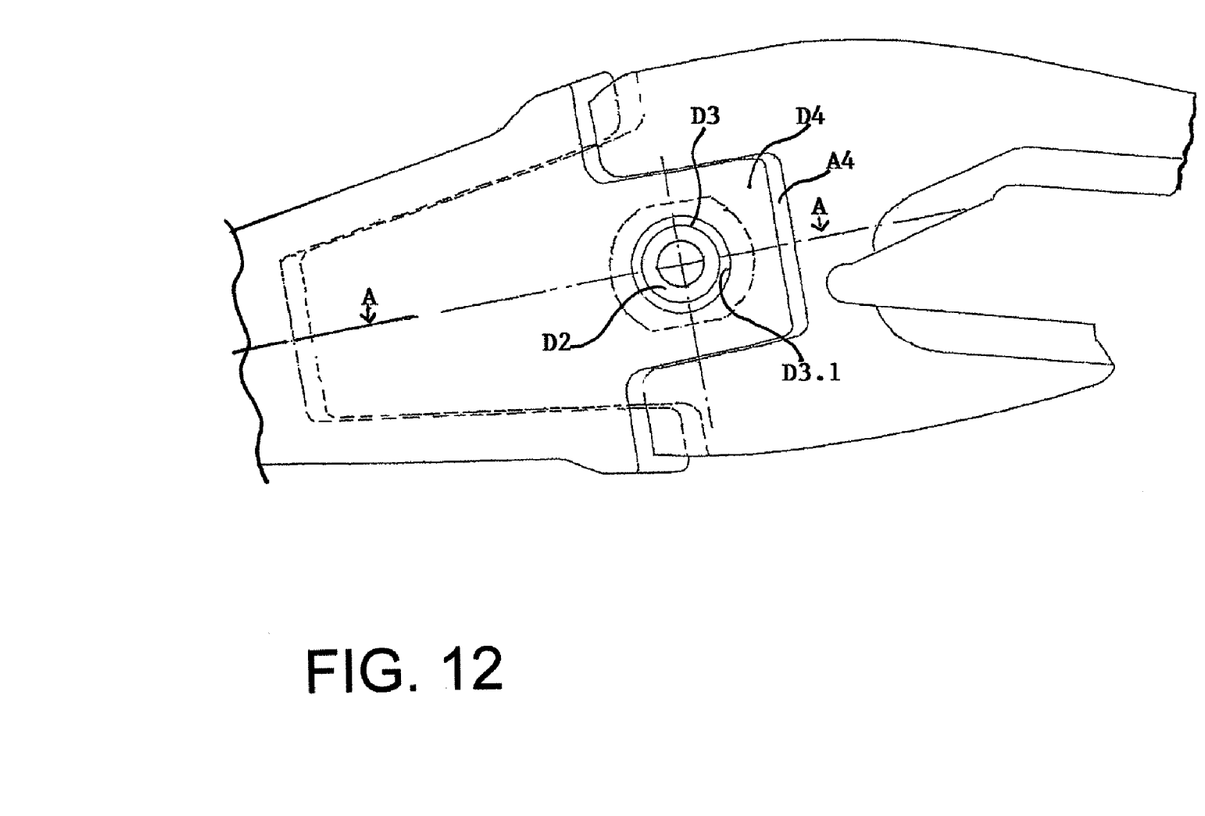
FIG. 12 is a side view of the tooth-adapter assembly mounted on the longitudinal side of the key head.
Figure 13:
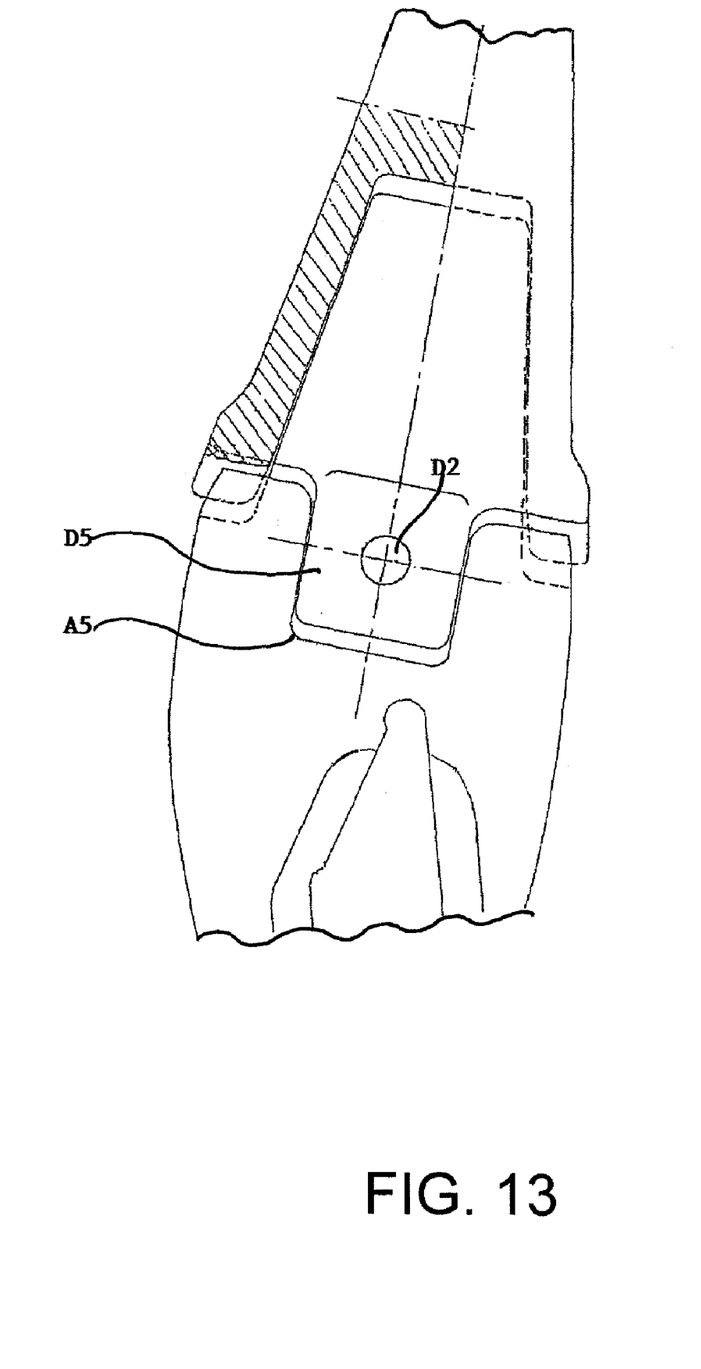
FIG. 13 is a side view of the tooth-adapter assembly mounted on the key foot side.

The tooth (D) shown in FIGS. 10 and 11 comprises two orifices (D2) and (D3) formed in the vertical and horizontal walls according to the configuration of the tooth, and as shown in the drawings as an example in the side ears (D4) (D5). The orifice (D3) receives the head (C4) of the key. The dimension of this orifice is selected in a particular manner and is larger than the diameter of the body (C1) of the key. More precisely, and in an advantageous embodiment, the diameter of the orifice (D3) is obtained by adding to the value of the diameter (C1) of the key, twice the difference between the value of the diameters (C5) and (C1) of the key. Furthermore, the orifice (D2) receives the end (C3) of the key foot with a substantially larger dimension than it to avoid creating an undesirable contact during certain misalignments of the key.

In addition, a recess (D6) formed in the ear (D4) provides access to the notch (C8) formed in the key for its disassembly.

It is important to discuss the assembly and operation of the connecting device in service. It is previously indicated that the assembly of the tooth and the adapter, according to their fitting geometry, may have variable relative positions with regard to one another and the connecting device of the invention, and in particular the key, which can be oriented at will in the axial and rotational direction, may be located in the plurality of positions. These positions are described below and are identified in the figures of the drawings (FIGS. 15 to 18.1) in which they are shown in six phases, where they perform the same role in each.

Figure 151:
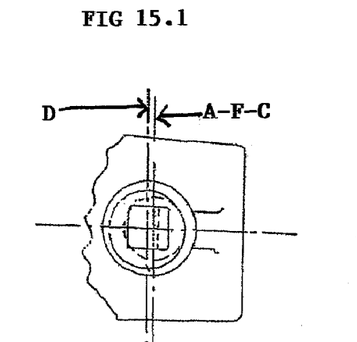

PHASE 1: This corresponds to the assembly of the various elements and represents the rest position, shown in FIGS. 15, 15.1.

Figure 15:
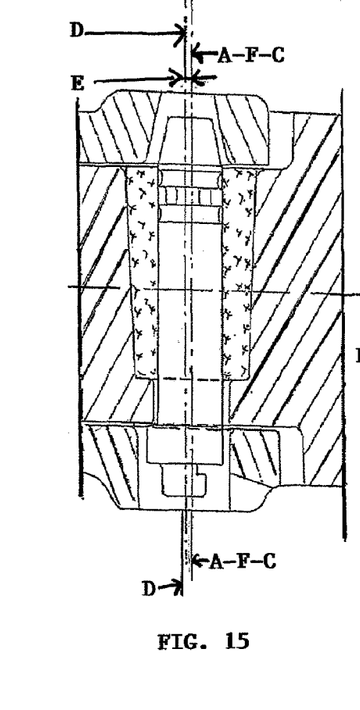
FIG. 15 is a partial view of the assembly with the positioning of the key and the sleeve in the first positioning phase, FIG. 15.1 is a view from below, according to FIG. 15.

The sleeve (F) is introduced and positioned in the housing (A2) of the adapter. The key (C) is introduced via the orifice (D3) by being pushed manually into the bore (F2) of the sleeve. The key in this phase is neither in contact with the tooth, nor with the adapter. The key head (C4) and in particular the offset portion (C5) is oriented to take place in the orifice (D3) of the tooth. As shown in FIGS. 15 and 15-1, the axis DD of the orifices (D2-D3) of the tooth is different from the axis A-F-C- common to the adapter, the sleeve and the key. In other words, the two axes DD and AFC are initially parallel, with a variable spacing E which may be zero if, fortuitously according to the geometry of the fitting considered, they were to merge. The complete penetration of the key into the sleeve is obtained when its face (C9) stops against the opposite face (A6) of the adapter.

Figure 16:
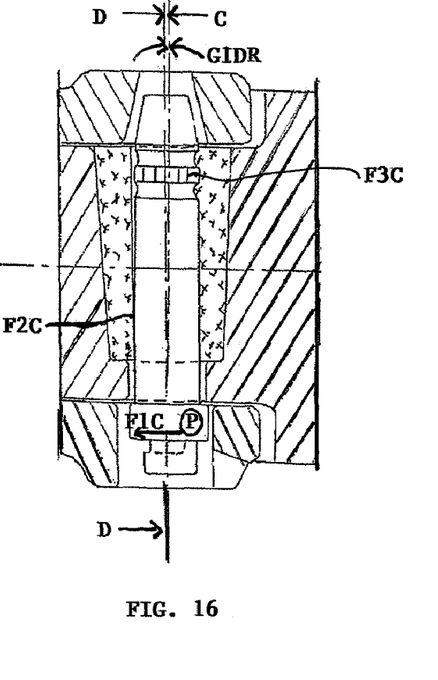
FIG. 16 is a partial view according to the second positioning phase, with a rotation of the key by a first angular distance, FIG. 16.1 is a view from below, according to FIG. 16.
Figure 161:
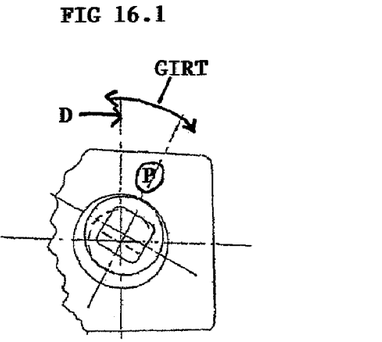

PHASE 2: This corresponds to a first tooth fixing and tightening mode as shown in FIGS. 16-16.1.

Figure 14:
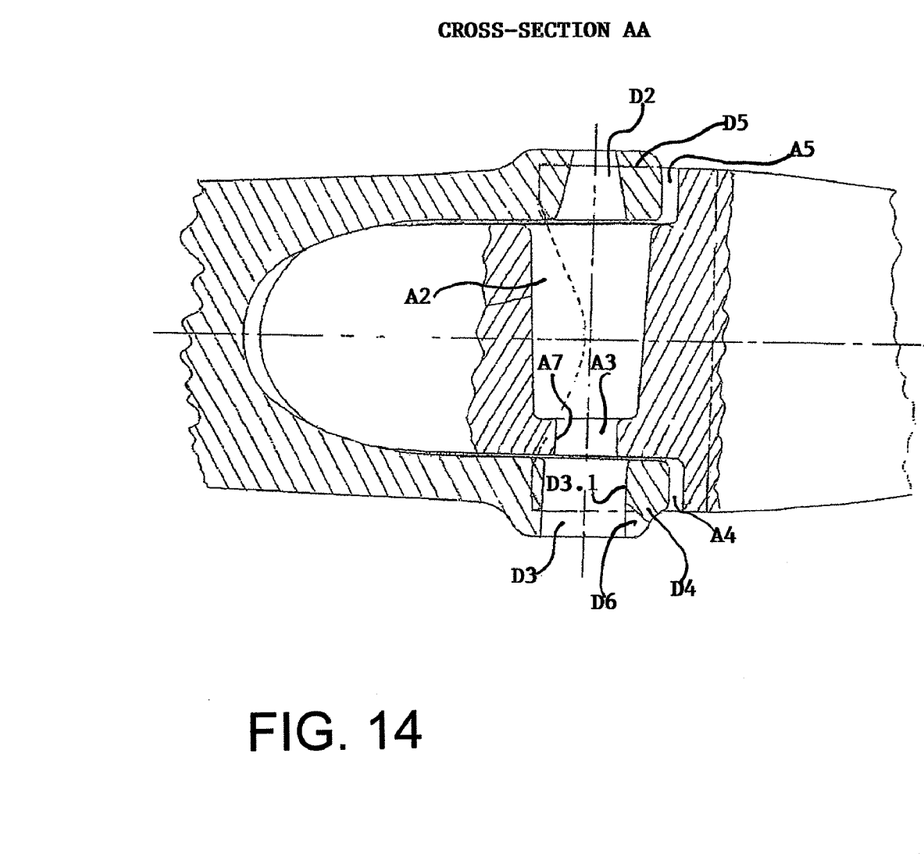
FIG. 14 is a longitudinal cross section of the tooth-adapter assembly mounted along section A.A of FIG. 12.

Using a standard mechanic's tool, such as a socket wrench mounted on the head of the key, the key is rotated so that the offset portion (C5) comes into contact with the surface of the back semi-circumference (D3.1) of the orifice D3 (shown in FIG. 14). Initially, this has the effect of bringing the tooth to the adapter on the zones provided for their contact in service. As soon as contact is made, the tooth is blocked. Thus, by continuing the rotation of the key, it is misaligned with regard to the initial axis A-F-C-, as shown in FIGS. 16 and 16.1. The head of the key, via its offset (C5) forced against the semi-circumferential surface (D3.1) on the first contact zone (P) with the side orifice formed on the teeth, receives a reactive force (F1C) which shifts the body (C1) frontward by compressing the sleeve (F) along the arrow (F2C) which, by resisting this compression, forces the opposite part of the key foot to tilt in the opposite direction and to subject the sleeve to a stress identified (F3C). Because of its elastically deformable material, the sleeve (F) is subject to deformation at the contact zones considered. Thus the zone (C6), by its particular configuration with the projecting and hollow portions, shown as examples by the grooves and projections (C6.1) are embedded in the sleeve and form an anchorage in the selected angular position while maintaining the key in place.

If the key rotation force is continued, the support stress of the part (C5) of the key is increased on the zone (D3.1) identified previously, and similarly, the compression of the sleeve restores a reactive force proportional to the one it receives.

Thus according to the invention, the key and more particularly the key body behaves like a lever arm partly blocked in the sleeve. Moreover, the key body transmits, from its portion (C5) to the point (P) an adjustable force on the face (D3.1) for the retention of the tooth. With reference to FIGS. 16, 16.1, it may be observed that the key misaligned with regard to its initial position, has changed its direction along the angle G1DR, and its rotation along the angle G1RT.

The positioning shown and described in FIGS. 16, 16.1 corresponds to the use of the coupling assembly for the needs of normal earthworks operations.

PHASE 3: This corresponds to a second tooth fixing and tightening level.

By continuing to rotate the key head and therefore its offset portion (C5) against the face (D3.1), the frontward movement of the key body (C1) continues and it comes into contact with the adapter on the face (A7) of the hole (A3) where it finds a fixed pivoting support at a second point (P1) (shown in FIG. 17) which further misaligns the key, increasing the retaining force in the sleeve and hence of the tooth.

Figure 17:
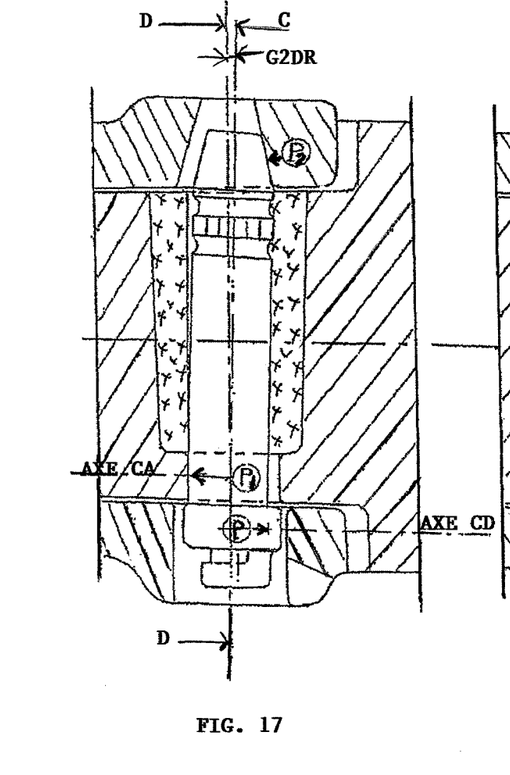
FIG. 17 is a partial view of the fourth positioning phase with a rotation of the key by a second angular distance, FIG. 17.1 is a view from below according to FIG. 17.
Figure 18:
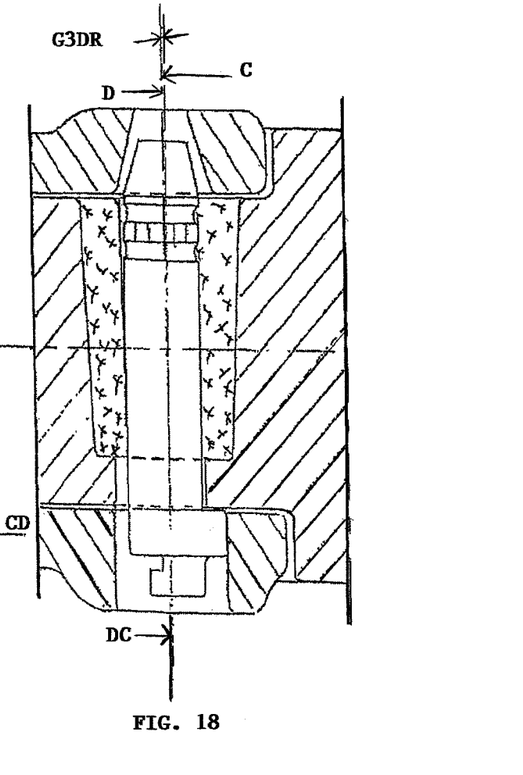
FIG. 18 is a partial view of the fifth positioning phase with a rotation of the key by a third angular distance, FIG. 18.1 is a plan view according to FIG. 18.
Figure 171:
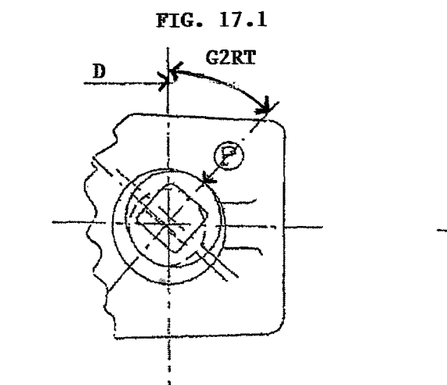

PHASE 4: This corresponds to the maximum tightening situation for the fixing of the tooth, and its representation as shown in FIGS. 17, 17.1.

In this situation, the operator making the adjustments further rotates the key using his tool of the aforementioned type.

By continuing to rotate the key and the offset portion (C5) against the face (D3.1), by the shifting of the axes (CD and CA) of the forces applied to the points P and P1 which create a torque, the misalignment of the key is further accentuated. Its conical end (C3) thus comes into contact for the first time along a third support point or zone (P2) consisting of the orifice (D2) of the tooth. This produces a tight mechanical keying by exclusively metallic contacts in the support zones (P1) on the adapter and (P) and (P2) on the rear faces in the two orifices (A3-A2) of the tooth. The sleeve now only has the function of securing the key in place, as well as its selected angular position. In this situation, the key has changed its directional orientation along the angle G2DR and that of its rotation along the angle G2RT. The keying thus established corresponds to severe working conditions.

Thus according to the invention, it may be observed that the retaining and supporting means are transferred by the progressive and controlled misalignment of the key according to the working conditions, with a possible precise adjustment of the retaining force. Either there is simply an anchoring in the sleeve for normal operating conditions, or in addition to the anchoring, there is a tightened support and thrust action where the metallic parts of the tooth and the adapter arranged for the implementation of the desired function.

Figure 181:
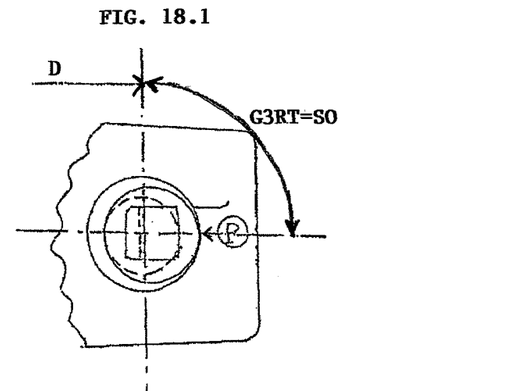

PHASE 5: This phase, shown in FIGS. 18-18.1 occurs when the adapter is worn in the final use phase. In this case, the extremely worn adapter produces a deeply penetrated position of a new tooth. The keying conditions obtained are similar to those of phase 2 with a change in directional orientation along the angle G3DR equivalent or weaker than the angle G1DR and rotational orientation along the angle G3RT at the value of 90° which corresponds to the maximum permitted by the system.

PHASE 6: This represents the disassembly of the key. After cleaning of the orifice D3 of the tooth if necessary, providing access to the key head and its projecting part (C7), the rotation is reversed to eliminate the support stresses given by the offset portion (C5) in the orifice (D3). The compression on the sleeve is cancelled. The key recovers its rest position shown in FIG. 15 and, by simple thrust against the end part (C3) via the orifice (D2) or by the action of a screwdriver in the notch C8 of the tooth, the key can be removed.

The novel solution of the invention therefore perfectly meets the desired objectives. In addition, it offers the permanent possibility of adjusting the pressure applied by the key in its connecting mode adapted to the nature of the operations performed and their service conditions.

The modification of the connecting mode and function of the key either by anchorage in the sleeve, or by the tight contact towards the metallic parts of the tooth and the adapter, or vice versa, is obtained by the specific conformation of the key and its misalignment capacity in the axial and rotational direction.

The inventive solution provides an unexpected advantage with this capacity of adjusting the anchoring pressure of the key on the coupling assembly according to the requirements in situ.

The invention claimed is:

1. Device for connecting a wear part to a support on materials handling equipment for public works machines, including a tooth for fining on an adapter, and their linkage with a sleeve made from elastically deformable material and a key, the tooth and the adapter being profiled with openings and zones for accommodating said sleeve and the key, the key being introduced into the sleeve and projecting beyond ends of the sleeve, the key being placed in an axial alignment with regard to the sleeve with a misalignment effect, the sleeve being placed in part of the adapter, wherein said key comprises a rigid, monolithic, cylindrical key having an elongated body with a key foot and a key head on respective opposite ends of the body, the body is installed in the sleeve while the key head projects beyond the sleeve, the key head includes a part forming an off-centered seat performing a support and thrust function against a matching shape in a first orifice of the tooth, and beyond the part, a relief zone with one or more notches for attaching a disassembly tool, the end of the key head is rotatable by operating means, the key foot comprises anchoring means to penetrate temporarily into the elastically deformable sleeve by a first tightening action of a predefined value, said anchoring means comprising a first zone having an arrangement of hollow and relief shapes for temporarily anchoring the key in the sleeve, and an end of the key foot is arranged with a final frustoconical portion to bear against a second orifice of the tooth as part of a tightening action greater than the first tightening action and resulting from rotation of the key, wherein the installed key is freely orientable in rotation and direction, and rotation of the key causes misalignment of the key with regard to an initial axis and the tight securing of the key, in the sleeve by anchoring of the first zone, and, upon further key rotation, against metal parts of the tooth and of the adapter on differentiated support zones, whereby adjustment of retention force of the key on the linkage in situ is provided, and wherein the tooth is connected and disconnected from the adapter without striking operations.

2. Device according to claim 1, wherein the off-centered seat comprises an offset cylindrical part having a larger diameter than a diameter of the body, and the key has a connecting face between the body and the offset cylindrical part.

3. Device according to claim 2, wherein the first zone comprises a plurality of splines or grooves having a depth that decreases with increasing distance from an end of the key foot, and the plurality of splines or grooves are supplemented on a periphery by hollow linkage zones constituting catching parts.

4. Device according to claim 2, wherein the offset cylindrical part is partly located tangentially abutting the body and projecting at an opposite end of the part to form an off-centering.

5. Device according to claim 4, wherein the key is able to make a complete 360° rotation about itself during service, in one direction or in another direction.

6. Device according to claim 2, wherein the sleeve has a frustoconical outer shape and a length shorter than a length of a nose section of the adapter in which the sleeve is accommodated and immobilized, and the sleeve has a central internal hole having a diameter equal to a diameter of the body of the key, and thickness of the sleeve varies according to position of misalignment that the key may assume in a service situation.

7. Device according to claim 6, wherein the sleeve has a slight internal shrinkage at a certain location of the central hole contributing to anchoring force.

8. Device according to claim 7, wherein the adapter, has a first orifice forming a transverse housing with a frustoconical configuration for guided reception of the sleeve, the sleeve having a matching configuration, and the transverse housing is suitable for accommodating the sleeve being therefore established on only part of a width of a receiving zone of the adapter, and the transverse housing has a sleeve stop face, and the transverse housing is prolonged by a matching second orifice or hole projecting into an outer side recess of the adapter, and the second orifice or hole has a substantially larger diameter than a diameter of the key body, and the sleeve is introduced via an opposite side recess, and a space between the second orifice or hole and an end of the transverse housing of the sleeve forms the shoulder.

9. Device according to claim 2, wherein the tooth comprises two orifices formed in vertical or horizontal walls or in side ears, and a first orifice of the orifices receives the key head, and a second orifice of the orifices receives the end of the key foot with a substantially larger dimension than the end.

10. Device according to claim 9, wherein a dimension of the first orifice is larger than a diameter of the body of the key by a value equal to twice a difference between a cross section of the offset cylindrical part and a cross section of the key body.

11. Device according to claim 9, wherein the tooth has a recess formed in an ear to provide access to the one or more notches formed in the key for disassembly.

12. Device according to claim 1, wherein the operating means is a socket wrench.

13. Method for implementing the device according to claim 9, wherein conforming of the key and its axial and rotational misalignment capacity allows modification of a linkage mode and function of the key either by anchoring in the sleeve, or by tight contact with metal parts of the tooth and of the adapter.

14. Method according to claim 13, further comprising the following steps:

inserting the sleeve into a housing of the adapter, the key not having any contact either with the tooth or with the adapter, the key head projecting into the second orifice of the tooth;

rotating of the key using a tool acting on the key head, so that the offset part contacts the first orifice causing a misalignment of the key and causing the anchoring of a portion of the key in the sleeve in a selected angular position, corresponding to a use for normal earthworks requirements, and the key body transmits, from its offset cylindrical part to a point P an adjustable force on a face for retaining the tooth.

15. Method according to claim 13, wherein by continuing to rotate the key head and its offset cylindrical part against the face of the tooth, forward movement of the key body continues and comes into contact with the adapter on a face of a hole where the key finds a fixed pivoting support at a second point which further misaligns the key, thereby increasing retaining force in the sleeve.

16. Method according to claim 15, wherein in severe working conditions, further rotating the key and the offset cylindrical part against the face of the tooth causes a transfer of support and contact zones of the key by a tight mechanical keying by exclusively metal contacts in the support zones on the adapter and on rear faces in the two orifices of the tooth.

* * * * *

UNITED STATES PATENT AND TRADEMARK OFFICE
CERTIFICATE OF CORRECTION

PATENT NO. : 7,690,137 B2  Page 1 of 1
APPLICATION NO. : 11/912615
DATED : April 6, 2010
INVENTOR(S) : Charles Pasqualini It is certified that error appears in the above-identified patent and that said Letters Patent is hereby corrected as shown below:

Claim 1, at Column 7, Line 8: Delete "a tooth for fining on" and insert -- a tooth for fitting on --

Signed and Sealed this

Twenty-second Day of June, 2010

David J. Kappos
*Director of the United States Patent and Trademark Office*